United States Patent [19]

Burnham

[11] Patent Number: 5,044,848
[45] Date of Patent: Sep. 3, 1991

[54] PARTITION SECUREMENT STRUCTURE FOR A PICK-UP TRUCK

[75] Inventor: Robert E. Burnham, Novi, Mich.

[73] Assignee: Chrysler Corporation, Highland Park, Mich.

[21] Appl. No.: 496,708

[22] Filed: Mar. 21, 1990

[51] Int. Cl.⁵ .............................................. B60P 1/64
[52] U.S. Cl. .................................... 410/102; 410/106; 410/152; 410/129; 108/60; 211/184; 248/499; 248/503; 296/24.1; 296/39.2
[58] Field of Search ............... 410/101, 102, 106, 108, 410/109, 112, 116, 121, 122, 129, 140, 141, 143, 144, 149, 151, 152, 153; 296/37.6, 39.2; 248/499, 503; 108/60, 61; 160/135; 211/184; 312/350

[56] References Cited

U.S. PATENT DOCUMENTS 935,560   9/1909  Stone .................................. 211/184
4,887,947 12/1989 Bott .................................. 410/129 X

FOREIGN PATENT DOCUMENTS 1491756 7/1989 U.S.S.R. ............................. 410/129

Primary Examiner—Robert J. Spar
Assistant Examiner—James Keenan
Attorney, Agent, or Firm—Edward A. Craig

[57] ABSTRACT

Partition securement structure is provided in the cargo compartment of a pick-up truck. The cargo compartment has a pair of spaced apart longitudinal side walls with openings therein. Wire retainers are received in the openings. Each wire retainer has a U-shaped recess to receive and removably secure the edge of a partition in place. The retainers have a dual function, being also useful as rope tie-down loops.

5 Claims, 2 Drawing Sheets

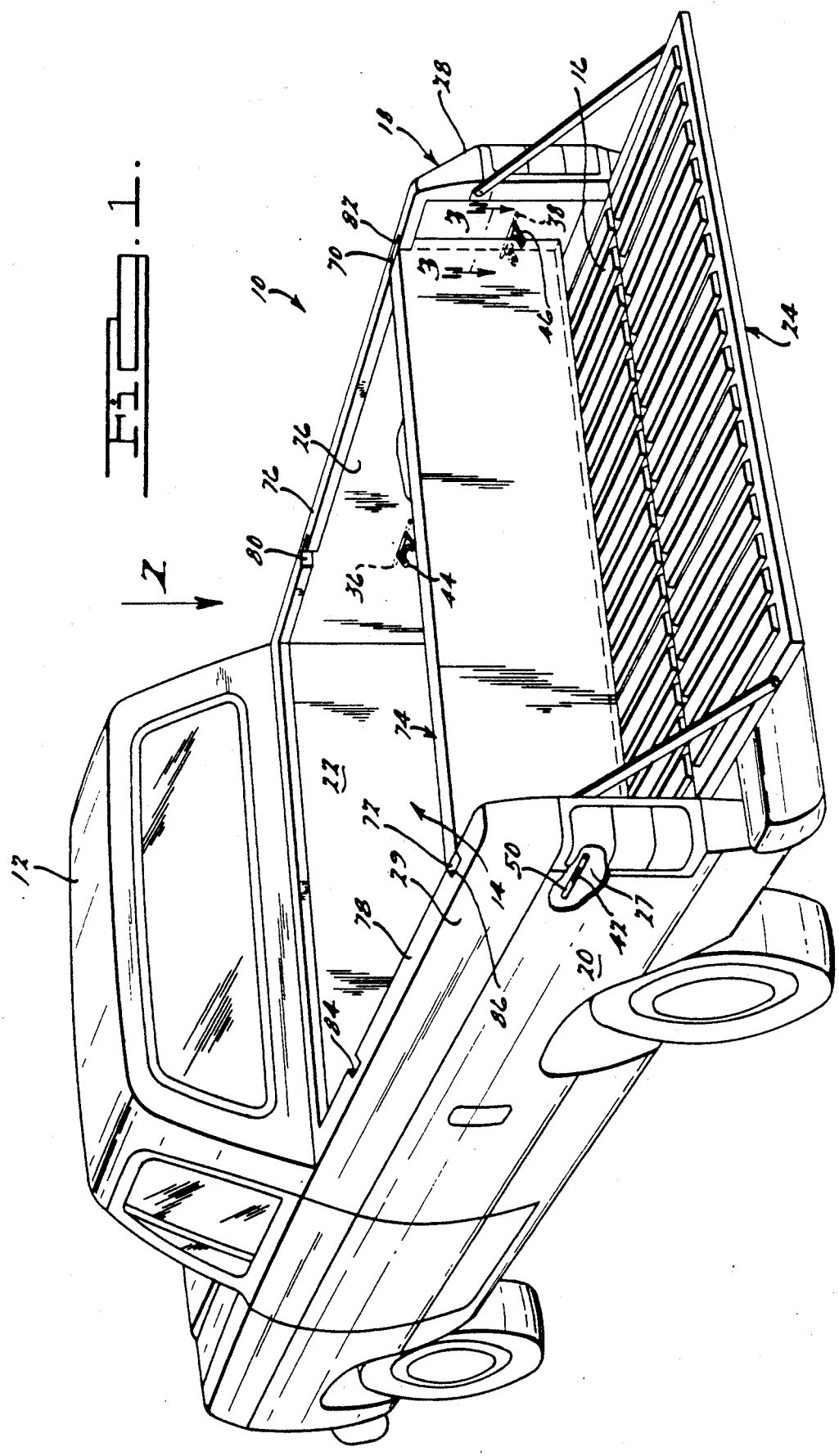

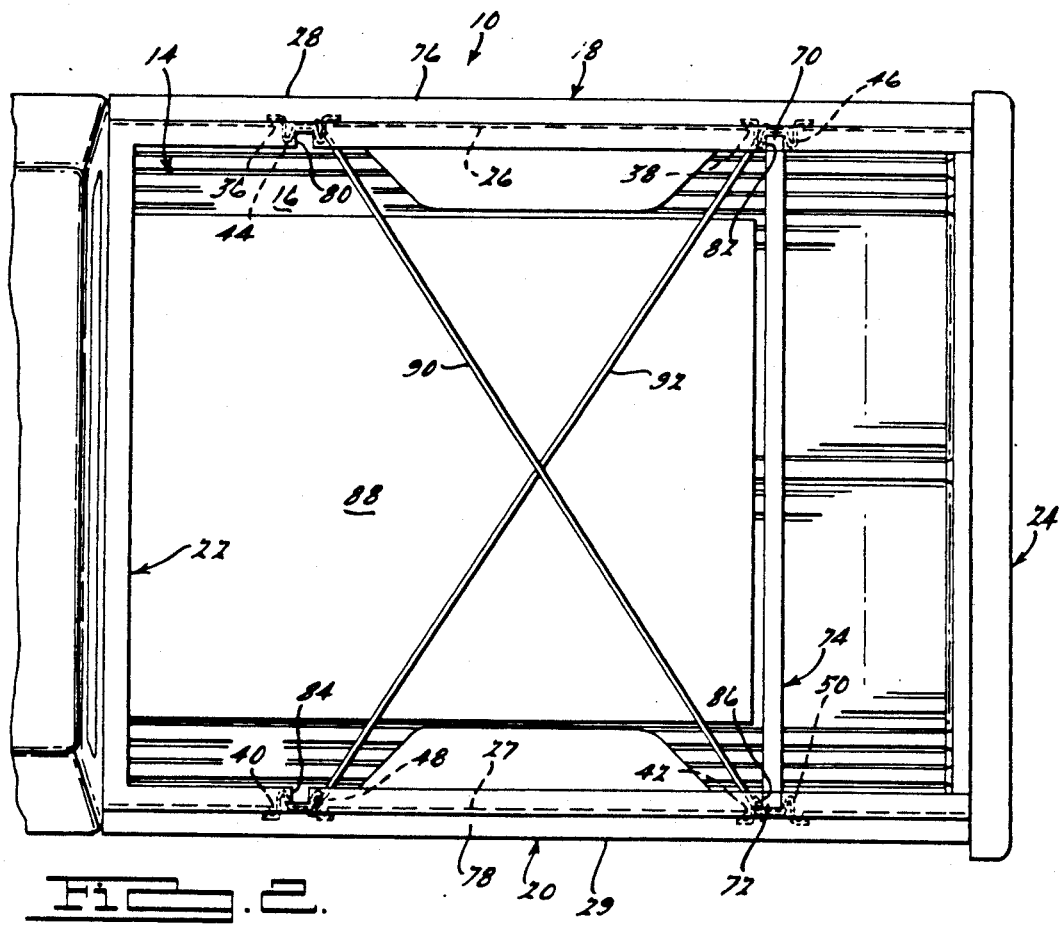
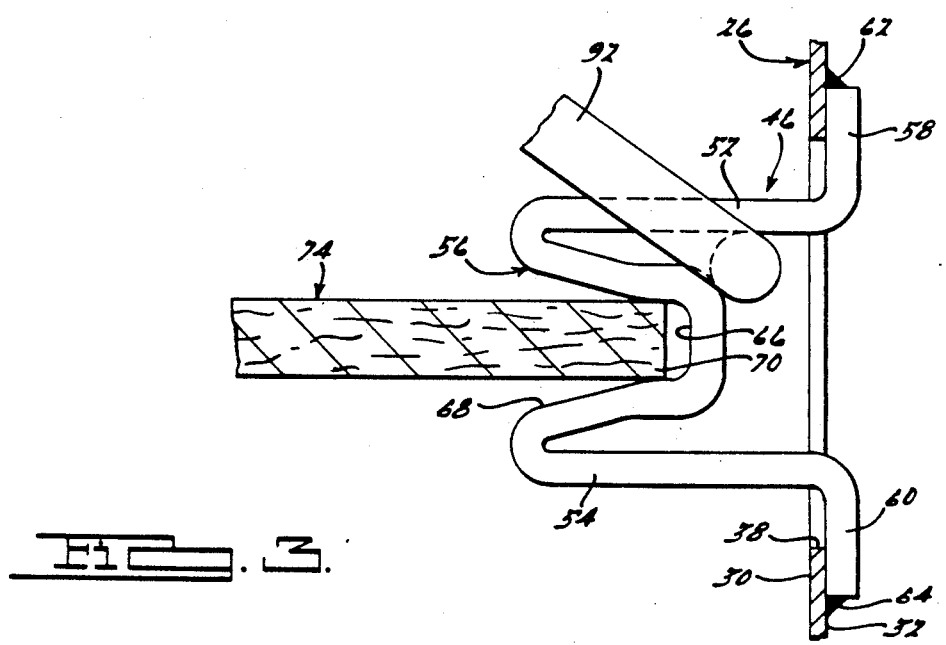

PARTITION SECUREMENT STRUCTURE FOR A PICK-UP TRUCK

BACKGROUND OF THE INVENTION

1. Field of the Invention

Partition securement structure is provided within the cargo compartment of a pick-up truck for removably mounting partitions in the truck cargo compartment for securing loads in the cargo compartment.

2. Description of Related Art

Pick-up trucks are frequently used to haul loads which do not fill the cargo compartment and which may be light weight items such as groceries. When such items do not fill the cargo space, they are free to slide about in the cargo compartment. Such sliding often results in damaging the items forming the load as a consequence of impacting against each other or against the side walls of the cargo space.

It is desirable to provide means for mounting bulkheads or partitions transversely of the cargo compartment in order to form smaller compartments which reduce or eliminate the undesirable sliding of cargo items. It is further desirable that such partitions be readily removable and mountable in order to conform the cargo compartment to the type of load which is to be carried. If the load is relatively small, the partition should be adjacent either the forward or rearward end of the cargo compartment. The partition should be readily removable to accommodate larger items or loads. It is further desirable that the partition securement means provide a method for attachment of tie-down ropes which desirably extend across the top of a load to prevent the load from bouncing up and down and also to inhibit sliding of the load.

These objectives are accomplished in accordance with the present invention by the provision of wire retainers secured to the longitudinally extending side walls of the cargo compartment of a pick-up truck. The retainers serve the dual purpose of removably mounting transverse partitions in the pick-up truck cargo compartment and also as tie-down loops for fastening of tie-down ropes as desired.

SUMMARY OF THE INVENTION

Partition securement structure is provided for a pick-up truck. The pick-up truck includes a cargo compartment defined, in part, by a cargo bed and a pair of spaced apart longitudinal side walls extending upwardly therefrom. Each side wall has an inner panel having an inner face and an outer face. Each inner panel has opening means therein. The opening means of one inner panel are in transverse alignment with the opening means of the other inner panel.

A pair of wire retainers is provided. Each retainer includes a pair of spaced apart legs. A web joins the legs together at one end. The other end of each leg has an out-turned foot. The feet of each retainer are received through one of said opening means from a point within the cargo compartment and abut against the outer face of the respective inner panel.

The web of each retainer is positioned within the cargo compartment. Each web has a generally U-shaped recess with the mouth thereof facing into the cargo compartment. Each retainer provides securement structure for one edge of a partition extending transversely between the cargo compartment side walls with the edges thereof being removably receivable in the retainer U-shaped recesses.

Preferably, the feet of each retainer are welded to the inner panels. The opening means are preferably adjacent to, but spaced from, the cargo bed and are in vertical registry with each other. Each side wall preferably has a rail structure along the upper edge thereof which projects inwardly of the cargo compartment. Each rail structure has a notch therein in vertical alignment with the U-shaped recess of the retainer in the respective side wall for reception of an edge of a partition. Preferably, at least two sets of retainers are provided in longitudinally spaced apart relationship with each other on the cargo compartment side walls.

IN THE DRAWINGS

FIG. 1 is a perspective view of a pick-up truck illustrating one embodiment of the partition securement structure provided in the cargo compartment thereof;

FIG. 2 is a view of the pick-up truck of FIG. 1 in the direction of arrow 2 with the tailgate raised and a load in place held down by tie down ropes; and FIG. 3 is a sectional view taken substantially along the line 3—3 of FIG. 1 looking in the direction of the arrows.

DETAILED DESCRIPTION OF A PREFERRED EMBODIMENT

Referring to FIG. 1, it will be noted that a pick-up truck 10 is illustrated. The truck 10 is of conventional design and includes a driver and passenger cab 12 with a cargo compartment 14 located therebehind. The cargo compartment 14 is defined by a cargo bed 16 from which extend upwardly a pair of spaced apart longitudinal side walls 18, 20, and a forward wall 22. A tailgate 24 is hingedly mounted at the rear of the cargo compartment 14 and may be raised and lowered as desired.

Each side wall 18, 20 includes an inner panel 26, 27 and an outer panel 28, 29. As will be noted in FIG. 3, each inner panel has an inner face 30 and an outer face 32. Opening means in the form of slots are provided in each inner panel 26, 27. Referring to FIG. 2, it will be noted that a pair of longitudinally spaced apart slots 36, 38 are provided in inner panel 26 and registering longitudinally spaced apart slots 40, 42 are provided in inner panel 27. As will be noted in FIG. 1, the slots are adjacent to but spaced vertically from the cargo bed 16. As also will be noted in FIG. 1, the slots are in vertical registry with each other, that is, they are spaced the same distance from the cargo bed 16. As will be noted in FIG. 2, the slots 36, 38 of panel 26 are in transverse alignment with the slots 40, 42 of the other inner panel 27.

A wire retainer 44, 46, 48, 50 is received in each slot. Referring to FIG. 3, it will be noted that each retainer includes a pair of spaced apart legs 52, 54 which are joined together at one end by a web 56. The other end of each leg has an out-turned foot 58, 60. The feet of each retainer are received through one of the slots from a point within the cargo compartment 14 and abut against the outer face 32 of the respective inner panel. Preferably, the feet 58, 60 are welded in place as at 62, 64 to securely fasten the retainer to the inner wall.

The web 56 of each retainer is positioned within the cargo compartment 14. Each web has a generally U-shaped recess 66 with the mouth 68 thereof facing into the cargo compartment 14.

Each retainer provides securement structure for one edge 70, 72 of a partition 74 (which may be fabricated of plywood) which extends transversely between the cargo compartment side walls 18, 20. The edges 70, 72 are removably receivable in the retainer U-shaped recesses 66. The partition 74 may thus be inserted or extracted as desired depending upon the load which is to be carried in the cargo compartment 14.

Each of the side walls 18, 20 has a rail structure 76, 78 along the upper edge thereof which projects inwardly of the cargo compartment 14. Each rail structure 76 and 78 has a pair of notches 80, 82 and 84, 86 provided therein. The notches are in vertical alignment with the U-shaped recesses 66 of the retainers 44, 46 and 48, 50 which are positioned therebeneath in the respective side walls 18, 20. The notches receive the edges 70, 72 adjacent the upper ends thereof. This provides a two point securement for each edge of the partition.

Referring to FIGS. 2 and 3, it will be noted that illustratively a load 88 is provided in the cargo compartment 14 between the partition 74 and forward wall 22. A tie-down rope 90, 92 extends diagonally across the top of the load 88 and is secured at each end to one of the wire retainers 44, 50 and 46, 48 to secure the load vertically. The retainers thus serve a dual purpose.

I claim:

1. The combination comprising a pick-up truck having partition securement structure thereon, the pick-up truck including a cargo compartment defined in part by a cargo bed and a pair of spaced apart longitudinal side walls extending upwardly therefrom, each side wall having an inner panel with an inner face and an outer face, each inner panel having opening means therein, said opening means being adjacent to, but spaced vertically from, the cargo bed, the opening means of one inner panel being in transverse alignment with the opening means of the other inner panel, a pair of wire retainers, each retainer including a pair of spaced apart legs, a web joining the legs together at one end, the other end of each leg having an outturned foot, the feet of each retainer being received through one of said opening means from a point within the cargo compartment and abutting against the outer face of the respective inner panel, the web of each retainer being positioned within the cargo compartment, each web having a generally U-shaped recess with the mouth thereof facing into the cargo compartment, each retainer providing securement structure for one side of a partition extending transversely between the cargo compartment side walls with the edges thereof being removably receivable in the retainer U-shaped recesses.

2. The combination as defined in claim 1 wherein the feet of each retainer are welded to said inner panels.

3. The combination as defined in claim 1 wherein said opening means are in vertical registry with each other.

4. The combination as defined in claim 1 wherein said side walls each have a rail structure along the upper edges thereof, each rail structure projecting inwardly of the cargo compartment, each rail structure having a notch therein a vertical alignment with the U-shaped recess of a retainer positioned therebeneath in the respective side wall for reception of an edge of a partition.

5. The combination as defined in claim 1 wherein at least two sets of retainers are provided in longitudinally spaced apart relationship with each other on the cargo compartment side walls.

* * * * *